US012750638B2

(12) United States Patent
Chen

(10) Patent No.: US 12,750,638 B2
(45) Date of Patent: Sep. 29, 2026

(54) METHOD AND DEVICE FOR MULTICAST/BROADCAST SERVICE-RELATED OPERATIONS

(71) Applicant: SHARP KABUSHIKI KAISHA, Sakai City (JP)

(72) Inventor: Hung-Chen Chen, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 390 days.

(21) Appl. No.: 18/230,898

(22) Filed: Aug. 7, 2023

(65) Prior Publication Data

US 2024/0056775 A1 Feb. 15, 2024

Related U.S. Application Data

(60) Provisional application No. 63/396,935, filed on Aug. 10, 2022.

(51) Int. Cl.

| | |
|---|---|
| ***H04W 4/06*** | (2009.01) |
| ***H04L 12/18*** | (2006.01) |
| ***H04W 68/00*** | (2009.01) |
| ***H04W 76/30*** | (2018.01) |

(52) U.S. Cl.

CPC ........... *H04W 4/06* (2013.01); *H04W 68/005* (2013.01); *H04W 76/30* (2018.02); *H04L 12/189* (2013.01)

(58) Field of Classification Search

CPC ..... H04W 4/06; H04W 68/005; H04W 76/30; H04W 76/40; H04W 76/27; H04W 4/20; H04L 12/189

See application file for complete search history.

(56) References Cited

U.S. PATENT DOCUMENTS

| | | | | |
|---|---|---|---|---|
| 2021/0127448 | A1 | 4/2021 | Kadiri et al. | |
| 2023/0189295 | A1 | 6/2023 | Baek et al. | |
| 2023/0362595 | A1* | 11/2023 | Fujishiro ................. | H04W 4/06 |
| 2024/0008128 | A1 | 1/2024 | Shrivastava et al. | |
| 2024/0080939 | A1* | 3/2024 | Fujishiro ................. | H04W 8/22 |

(Continued)

FOREIGN PATENT DOCUMENTS

WO 2021230595 A1 11/2021

OTHER PUBLICATIONS

Qualcomm Incorporated: "Enhancements to support Multicast reception by UEs in RRC_Inactive state", 3GPP Draft; R3-224245, 3GPP TSG-RAN3 Meeting #117-e, Online, Aug. 15-25, 2022 (Aug. 9, 2022).

(Continued)

*Primary Examiner* — Thomas R Cairns
*Assistant Examiner* — Raenita Ann Fenner
(74) *Attorney, Agent, or Firm* — ScienBiziP, P.C.

(57) ABSTRACT

Methods and devices for Multicast/Broadcast Service (MBS)-related operations are provided. The method includes receiving a Radio Resource Control (RRC) release message from a Base Station (BS), the RRC release message including a suspending configuration indicating that the UE is allowed to receive, in an RRC_INACTIVE state, data of an MBS Radio Bearer (MRB) associated with a multicast session; transitioning to the RRC_INACITVE state in response to receiving the RRC release message; and receiving the data of the MRB after transitioning to the RRC_INACTIVE state.

12 Claims, 5 Drawing Sheets

(56) References Cited

U.S. PATENT DOCUMENTS

| | | | | |
|---|---|---|---|---|
| 2025/0048062 | A1* | 2/2025 | Li | H04W 72/30 |
| 2025/0133629 | A1* | 4/2025 | Wu | H04W 76/40 |

OTHER PUBLICATIONS

Lenovo: "PTM configuration for multicast reception in RRC_ Inactive", 3GPP Draft; R3-224438, 3GPP TSG-RAN WG3 Meeting #117-e, E-meeting, Aug. 15-24, 2022 (Aug. 9, 2022).

Qualcomm Inc: "NR MBS control signalling aspects for UEs in different RRC states", R2-2103178, 3GPP TSG-RAN WG2 Meeting #113bis-e, E-Meeting: Apr. 12-19, 2021 (Apr. 2, 2021).

3GPP TS 38.331 V17.0.0 (Mar. 2022), 3rd Generation Partnership Project; Technical Specification Group Radio Access Network; NR; Radio Resource Control (RRC) protocol specification (Release 17).

* cited by examiner

METHOD AND DEVICE FOR MULTICAST/BROADCAST SERVICE-RELATED OPERATIONS

CROSS-REFERENCE TO RELATED APPLICATION(S)

The present disclosure claims the benefit of and priority to U.S. Provisional Patent Application Ser. No. 63/396,935, filed on Aug. 10, 2022, entitled "MULTICAST SERVICE DATA RECEPTION IN RRC_INACTIVE STATE," the content of which is hereby incorporated herein fully by reference into the present disclosure for all purposes.

FIELD

The present disclosure generally relates to wireless communications and, more particularly, to methods and devices for Multicast/Broadcast Service (MBS)-related operations.

BACKGROUND

With the tremendous growth in the number of connected devices and the rapid increase in user/network (NW) traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize NW services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in the next-generation wireless communication systems.

SUMMARY

The present disclosure is directed to methods and devices for Multicast/Broadcast Service (MBS)-related operations.

According to a first aspect of the present disclosure, a method performed by a User Equipment (UE) for Multicast/Broadcast Service (MBS)-related operations is provided. The method includes receiving a Radio Resource Control (RRC) release message from a Base Station (BS), the RRC release message including a suspending configuration indicating that the UE is allowed to receive, in an RRC_INACTIVE state, data of an MBS Radio Bearer (MRB) associated with a multicast session; transitioning to the RRC_INACITVE state in response to receiving the RRC release message; and receiving the data of the MRB after transitioning to the RRC_INACTIVE state.

In some implementations of the first aspect of the present disclosure, the method further includes receiving deactivation signaling from the BS, the deactivation signaling indicating that the multicast session associated with the MRB is to be deactivated; and stopping receiving the data of the MRB in response to receiving the deactivation signaling.

In some implementations of the first aspect of the present disclosure, the method further includes receiving activation signaling from the BS after stopping receiving the data of the MRB, the activation signaling indicating that the multicast session associated with the MRB is to be activated; and resuming reception of the data of the MRB in response to receiving the activation signaling.

In some implementations of the first aspect of the present disclosure, receiving the activation signaling from the BS includes receiving a paging message from the BS, the paging message including a Temporary Mobile Group Identity (TMGI) associated with the multicast session.

In some implementations of the first aspect of the present disclosure, the method further includes joining a multicast session associated with the MRB before receiving the data of the MRB.

In some implementations of the first aspect of the present disclosure, the method further includes refraining from transmitting a Hybrid Automatic Repeat Request (HARM) feedback corresponding to the data of the MRB.

In some implementations of the first aspect of the present disclosure, the method further includes transmitting a capability report to the BS, the capability report indicating that the UE supports receiving the data of the MRB in the RRC_INACTIVE state.

In some implementations of the first aspect of the present disclosure, receiving the data of the MRB includes applying a Group Radio Network Temporary Identifier (G-RNTI) to receive the data of the MRB.

According to a second aspect of the present disclosure, a User Equipment (UE) for Multicast/Broadcast Service (MBS)-related operations is provided. The UE includes at least one processor and at least one memory coupled to the at least one processor. The at least one memory stores one or more computer-executable instructions that, when executed by the at least one processor, cause the UE to receive a Radio Resource Control (RRC) release message from a Base Station (BS), the RRC release message including a suspending configuration indicating that the UE is allowed to receive, in an RRC_INACTIVE state, data of an MBS Radio Bearer (MRB) associated with a multicast session; transition to the RRC_INACITVE state in response to receiving the RRC release message; and receive the data of the MRB after transitioning to the RRC_INACTIVE state.

In some implementations of the second aspect of the present disclosure, the one or more computer-executable instructions, when executed by the at least one processor, further cause the UE to receive deactivation signaling from the BS, the deactivation signaling indicating that the multicast session associated with the MRB is to be deactivated; and stop receiving the data of the MRB in response to receiving the deactivation signaling.

In some implementations of the second aspect of the present disclosure, the one or more computer-executable instructions, when executed by the at least one processor, further cause the UE to receive activation signaling from the BS after stopping receiving the data of the MRB, the activation signaling indicating that the multicast session associated with the MRB is to be activated; and resume reception of the data of the MRB in response to receiving the activation signaling.

In some implementations of the second aspect of the present disclosure, receiving the activation signaling from the BS includes receiving a paging message from the BS, the paging message including a Temporary Mobile Group Identity (TMGI) associated with the multicast session.

In some implementations of the second aspect of the present disclosure, the one or more computer-executable instructions, when executed by the at least one processor, further cause the UE to join a multicast session associated with the MRB before receiving the data of the MRB.

In some implementations of the second aspect of the present disclosure, the one or more computer-executable instructions, when executed by the at least one processor, further cause the UE to refrain from transmitting a HARQ feedback corresponding to the data of the MRB.

In some implementations of the second aspect of the present disclosure, the one or more computer-executable instructions, when executed by the at least one processor, further cause the UE to transmit a capability report to the BS, the capability report indicating that the UE supports receiving the data of the MRB in the RRC_INACTIVE state.

In some implementations of the second aspect of the present disclosure, receiving the data of the MRB includes applying a Group Radio Network Temporary Identifier (G-RNTI) to receive the data of the MRB.

According to a third aspect of the present disclosure, a Base Station (BS) for Multicast/Broadcast Service (MBS)-related operations is provided. The BS includes at least one processor and at least one memory coupled to the at least one processor. The at least one memory stores one or more computer-executable instructions that, when executed by the at least one processor, cause the BS to transmit a Radio Resource Control (RRC) release message to a User Equipment (UE), causing the UE to transition to an RRC_INACTIVE state, the RRC release message including a suspending configuration that indicates to the UE that the UE is allowed to receive, in the RRC_INACTIVE state, data of an MBS Radio Bearer (MRB) associated with a multicast session; and transmit the data of the MRB to the UE after transmitting the RRC release message to the UE.

In some implementations of the third aspect of the present disclosure, the one or more computer-executable instructions, when executed by the at least one processor, further cause the BS to transmit deactivation signaling to the UE, causing the UE to stop receiving the data of the MRB, where the deactivation signaling indicates that the multicast session associated with the MRB is to be deactivated.

In some implementations of the third aspect of the present disclosure, the one or more computer-executable instructions, when executed by the at least one processor, further cause the BS to transmit, after transmitting the deactivation signaling, activation signaling to the UE, causing the UE to resume reception of the data of the MRB, where the activation signaling indicates that the multicast session associated with the MRB is to be activated.

In some implementations of the third aspect of the present disclosure, transmitting the activation signaling to the UE includes transmitting a paging message to the UE, the paging message including a Temporary Mobile Group Identity (TMGI) associated with the multicast session.

In some implementations of the third aspect of the present disclosure, the one or more computer-executable instructions, when executed by the at least one processor, further cause the BS to receive a capability report from the UE, the capability report indicating that the UE supports receiving the data of the MRB in the RRC_INACTIVE state.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
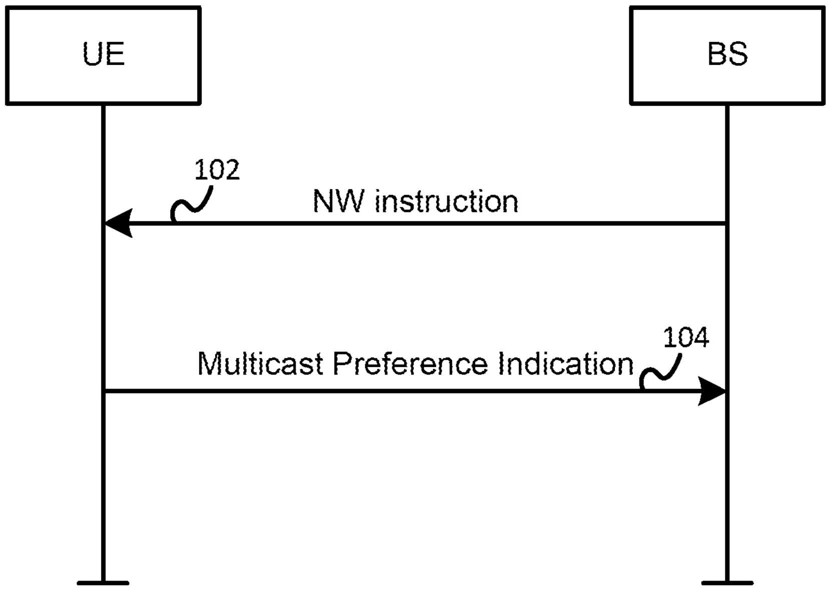
FIG. 1 is a diagram illustrating a procedure in which a UE transmits a multicast preference indication to a BS, according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrase "in some implementations," which may refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C," "at least one of the following: A, B and C," "at least one of A, B or C," and "at least one of the following: A, B or C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any NW function(s) or algorithm(s) described in the present disclosure may be implemented by hardware, software, or a combination of software and hardware. Described functions may correspond to modules which may be software, hardware, firmware, or any combination thereof. The software implementation may include computer executable instructions stored on computer readable medium, such as a memory or other types of storage devices. For example, one or more microprocessors or general-purpose computers with communication processing capability may be programmed with corresponding executable instructions and carry out the described NW function(s) or algorithm(s). The microprocessors or general-purpose computers may be formed of Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication NW architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional NW elements that provide connection toward the NW. The UE communicates with the NW (e.g., a Core Network (CN), an Evolved Packet Core (EPC) NW, an Evolved Universal Terrestrial Radio Access Network (E-UTRAN), a 5G Core (5GC), or an internet), through a RAN established by one or more BS s.

It should be noted that, in the present application, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access NW.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next-generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access NW. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink (DL) and optionally uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next-generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a DL transmission data, a guard period, and an UL transmission data should at least be included, where the respective portions of the DL transmission data, the guard period, and the UL transmission data should also be configurable, for example, based on the NW dynamics of NR. In addition, SL resources may also be provided in an NR frame to support ProSe services or V2X services.

In addition, the terms "system" and "NW" herein may be used interchangeably. The term "and/or" herein is only an association relationship for describing associated objects, and represents that three relationships may exist. For example, A and/or B may indicate that A exists alone, A and B exist at the same time, or B exists alone. In addition, the character "/" herein generally represents that the former and latter associated objects are in an "or" relationship. Multiple PLMNs may operate on the unlicensed spectrum. Multiple PLMNs may share the same unlicensed carrier. The PLMNs may be public or private. Public PLMNs may be (but not limited to) the operators or virtual operators, which provides radio services to the public subscribers. Public PLMNs may own the licensed spectrum and support the radio access technology on the licensed spectrum as well. Private PLMNs may be (but not limited to) the micro-operators, factories, or enterprises, which provides radio services to its private users (e.g., employees or machines). In some implementations, public PLMNs may support more deployment scenarios (e.g., carrier aggregation between licensed band NR (PCell) and NR-U (SCell), dual connectivity between licensed band LTE (PCell) and NR-U (PSCell), stand-alone NR-U, an NR cell with DL in unlicensed band and UL in licensed band, dual connectivity between licensed band NR (PCell) and NR-U (PSCell)). In some implementations, private PLMNs mainly support (but not limited to) the stand-alone unlicensed radio access technology (e.g., stand-alone NR-U).

Some of the terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

To enhance resource efficiency in delivery, the Third Generation Partnership Project (3GPP) has introduced mechanisms for supporting New Radio (NR) broadcast/multicast services in Release 17 (e.g., 3GPP Technical Specification (TS) 38.300 v17.0.0).

A broadcast service is viewed as a communication service with a lower quality of service (QoS). In a broadcast service, identical specific content data is delivered simultaneously to all User Equipment (UEs) within a geographic area, using a broadcast session. A UE may receive data from/through a broadcast service while the UE is in an RRC_IDLE, RRC_INACTIVE, or RRC_CONNECTED state.

In contrast, a multicast service is regarded as a communication service with a higher QoS. For a multicast service, identical specific content data is delivered simultaneously to a select set of UEs (e.g., UEs authorized to receive the multicast data), using a multicast session. However, a UE may only receive data from a multicast service, when the UE is in the RRC_CONNECTED state. Furthermore, the NW or a serving base station may transmit one or more different Multicast MBS Radio Bearer (MRB) configurations in a dedicated RRC signal to configure a UE to receive data from a multicast service via Point-to-Point (PTP) or Point-to-Multipoint (PTM) delivery modes. Here, a multicast MRB refers to a radio bearer configured for multicast delivery (or a multicast service/session).

The one or more multicast MRB configurations may include at least one of the following:

- Multicast MRB with DL only Radio Link Control (RLC)-Unacknowledge Mode (UM) or bidirectional RLC-UM configuration for PTP transmission;
- Multicast MRB with RLC-Acknowledge mode (AM) entity configuration for PTP transmission;
- Multicast MRB with DL only RLC-UM entity for PTM transmission;
- Multicast MRB with two RLC-UM entities, one DL only RLC-UM entity for PTP transmission and the other DL only RLC-UM entity for PTM transmission;
- Multicast MRB with three RLC-UM entities, one DL RLC-UM entity and one UL RLC-UM entity for PTP transmission and the other DL only RLC-UM entity for PTM transmission; and
- Multicast MRB with two RLC entities, one RLC-AM entity for PTP transmission and the other DL only RLC-UM entity for PTM transmission.

To ensure a higher QoS, Hybrid Automatic Repeat Request (HARQ) feedback/retransmission may be implemented in both PTP and PTM transmissions.

Restricting a UE to be able to receive data from a multicast service/session exclusively when the UE is in the RRC_CONNECTED state, however, may not be advantageous for NW capacity, latency reduction, and/or power saving purposes. For example, in a cell with a large number of UEs, if there is an ongoing multicast service, such as a Mission Critical Service, the NW may not be able to serve all these UEs simultaneously since they all need to be in the RRC_CONNECTED state. Furthermore, each UE that is not in the RRC_CONNECTED state may have to perform a connection establishment procedure to transition into the RRC_CONNECTED state, which could lead to significant signaling overhead and high competition for random access (RA). Some UEs may experience RA failures for a while, and the requirements for receiving data from such Mission Critical Services may not be met. In addition, staying in the RRC_CONNECTED state uses more power than remaining in the RRC_INACTIVE or RRC_IDLE states.

Therefore, new mechanisms are needed to support multicast service data reception in other RRC states, such as the RRC_INACTIVE state, at least for the purpose of power saving. Methods for supporting multicast service data reception in the RRC_INACTIVE state, including UE capability reporting, signaling design, and the corresponding UE behavior, are disclosed in the present implementations.

In some implementations, a UE may report its capability (e.g., to a BS) to indicate its support for receiving data from multicast services (or performing MBS multicast reception) in the RRC_INACTIVE state. In some implementations, a UE may report (e.g., to a BS) a first capability to indicate support for receiving data from multicast services in the RRC_CONNECTED state and a second capability to indicate support for receiving data from multicast services in the RRC_INACTIVE state.

In some implementations, a UE may report its capability (e.g., to a BS) to indicate the additional maximum number of MRBs (MBS Radio Bearers) the UE supports for MBS multicast reception in the RRC_INACTIVE state. In some implementations, a UE may not report its capability to indicate the additional maximum number of MRBs (that the UE supports for MBS multicast reception in the RRC_INACTIVE state), but the UE may support MBS multicast reception in the RRC_INACTIVE state (e.g., based on another UE capability). In such a situation, a first additional maximum number of MRBs (that the UE supports for MBS multicast reception in the RRC_INACTIVE state) may be the same as a second additional maximum number of MRBs (that the UE supports for MBS multicast reception in the RRC_CONNECTED state, where the second additional maximum number of MRBs may be reported by the UE via maxMRB-Add-r17 Information Element (IE), as introduced in 3GPP TS 38.331 v17.0.0).

In some implementations, a UE may report its capability (e.g., to a BS) to indicate the maximum number of simultaneous receptions of Physical Downlink Control Channel (PDCCH) scrambled with Group-Radio Network Temporary Identifiers (G-RNTIs)/Group-Configured Scheduling-RNTIs (G-CS-RNTIs) for MBS multicast in the RRC_INACTIVE state. In some implementations, a UE may not report its capability to indicate the maximum number of simultaneous receptions of PDCCH scrambled with G-RNTIs/G-CS-RNTIs for MBS multicast in the RRC_INACTIVE state, but the UE may support MBS multicast reception in the RRC_INACTIVE state (e.g., based on another UE capability). In such a situation, a first maximum number of simultaneous receptions of PDCCH (scrambled with G-RNTIs/G-CS-RNTIs for MBS multicast in the RRC_INACTIVE state) may be the same as a second maximum number of simultaneous receptions of PDCCH (scrambled with G-RNTIs/G-CS-RNTIs for MBS multicast in the RRC_CONNECTED state). The second maximum number of simultaneous receptions of PDCCH may be reported by the UE via maxNumberRNTIs-MBS-r17 IE, as introduced in 3GPP TS 38.331 v17.0.0. The G-RNTI refers to Group RNTI, which may be used for dynamically scheduled MBS PTM transmission. G-CS-RNTI may be used for configured scheduled multicast transmission (e.g., for activation, reactivation, retransmission, or deactivation).

In some implementations, a UE (e.g., a UE capable of MBS multicast reception, interested in MBS multicast reception, or having joined one or more multicast services/sessions) may transmit a multicast interest indication to inform the NW that the UE prefers to perform MBS multicast reception in the RRC_INACTIVE state. In other implementations, a UE (e.g., a UE capable of MBS multicast reception, interested in MBS multicast reception, or having joined one or more multicast services/sessions) may be allowed to transmit a multicast interest indication to inform the NW that the UE prefers to perform MBS multicast reception in the RRC_INACTIVE state, for example, after receiving the NW instructions provided via broadcast system information or dedicated signaling (e.g., an RRC message, a Medium Access Control (MAC) Control Element (CE), or Downlink Control Information (DCI)). For example, if an allowance indication is set to true (e.g., in a system information block X, and/or in a multicast MRB configuration or RRC reconfiguration message) by the NW, a UE may transmit a multicast interest indication to inform the NW that the UE prefers to perform MBS multicast reception in the RRC_INACTIVE state. In some implementations, a UE may transmit multicast interest indication in response to at least one of the following situations: successful establishment of a connection, entering or exiting a Radio Access Network (RAN) notification area, activation or deactivation of an MBS multicast session, a change of interest, change in priority between MBS multicast reception and unicast reception, change to a Primary Cell (PCell) that is multicasting joined multicast services/sessions, among other situations.

FIG. 1 is a diagram illustrating a procedure in which a UE transmits a multicast preference indication to a BS, according to an example implementation of the present disclosure. In action 102, the BS (e.g., a gNB) may transmit a NW instruction to the UE. In response to receiving the NW instruction, the UE is allowed to transmit a multicast interest indication to the BS. In action 104, the UE may transmit the multicast preference indication to the BS. For example, the UE may transmit the multicast preference indication to the BS in response to a preference of remaining in the RRC_CONNECTED state or a preference of transitioning to the RRC_INACTIVE state. In some implementations, the decision on whether to transmit the multicast preference indication to the BS or not may depend on the UE implementation. In the present disclosure, the term "multicast preference indication" and the term "multicast interest indication" may be used interchangeably. In some implementations, the NW may request a UE (e.g., a UE capable of MBS multicast reception, interested in MBS multicast reception, or having joined one or more multicast services/sessions) to respond if the UE prefers to perform MBS multicast reception in the RRC_INACTIVE state. In some implementations, a UE that transmits a multicast interest indication to inform the NW that the UE prefers to perform MBS multicast reception in the RRC_INACTIVE state may imply that the UE supports receiving data of/from multicast services in the RRC_INACTIVE state.

In some implementations, a UE (e.g., a UE capable of MBS multicast reception, interested in MBS multicast reception, or having joined one or more multicast services/sessions) may transmit a multicast interest indication to inform the NW that the UE prefers to perform MBS multicast reception in the RRC_CONNECTED state. In some implementations, a UE (e.g., a UE capable of MBS multicast reception, interested in MBS multicast reception, or having joined one or more multicast services/sessions) may be allowed to transmit a multicast interest indication to inform the NW that the UE prefers to perform MBS multicast reception in the RRC_CONNECTED state based on the NW instructions provided, for example, via broadcast system information or dedicated signaling (e.g., an RRC message, a MAC CE, or DCI). For example, if an allowance indication is set to true (e.g., in a system information block X, and/or in a multicast MRB configuration or RRC reconfiguration message), a UE may transmit a multicast interest indication to inform the NW that the UE prefers to perform MBS multicast reception in the RRC_CONNECTED state. In some implementations, the NW may request a UE (e.g., a UE capable of MBS multicast reception or interested in MBS multicast reception) to respond if the UE prefers to perform MBS multicast reception in the RRC_CONNECTED state. In some implementations, a UE that transmits a multicast interest indication to inform the NW that the UE prefers to perform MBS multicast reception in the RRC_CONNECTED state may imply that the UE does not support receiving data of/from multicast services in the RRC_INACTIVE state.

In some implementations, a UE may transmit a multicast interest indication. This multicast interest indication may inform the NW that the UE prefers to perform MBS multicast reception in the RRC_INACTIVE state. For example, if a UE sets a multicast interest indication to a specific value (e.g., "1" or "TRUE"), this means that the UE prefers to perform MBS multicast reception in the RRC_INACTIVE state. Conversely, if the UE sets the multicast interest indication to another specific value (e.g., "0" or "False"), this indicates that the UE prefers to perform MBS multicast reception in the RRC_CONNECTED state. In some implementations, a UE may transmit a multicast interest indication, informing the NW that the UE prefers to perform MBS multicast reception either in the RRC_INACTIVE state or the RRC_CONNECTED state. For example, the multicast interest indication may be set to either "RRC_CONNECTED" or "RRC_INACTIVE". If a UE sets the multicast interest indication to "RRC_CONNECTED", this means/suggests that the UE prefers to perform MBS multicast reception in the RRC_CONNECTED state. If the UE sets the multicast interest indication to "RRC_INACTIVE", this means/suggests that the UE prefers to perform MBS multicast reception in the RRC_INACTIVE state.

In some implementations, the above-mentioned multicast interest indications may be included as the content of an MBS Interest Indication message (e.g., as introduced in 3GPP TS 38.331 V17.0.7).

In some implementations, a UE that is in an RRC_INACTIVE state (may also be referred to as an RRC_INACTIVE UE) or in an RRC_CONNECTED state (may also be referred to as an RRC_CONNECTED UE) may receive an RRC release message (e.g., RRCRelease) with a suspense/suspending configuration (e.g., suspendConfig). The RRC message or the suspending configuration may indicate that the MBS multicast reception in the RRC_INACTIVE state is allowed or configured. That is, the current MRB configurations may continue to be stored, retained, or (re)configured in the RRC_INACTIVE state. The PTP leg, or PTP configuration, associated with each MRB may be suspended or released. In contrast, the PTM leg, or PTM configuration, associated with each MRB (or its associated multicast session) may be kept/operated or remain. The HARQ operation (or HARQ resources) of a PTM leg (or PTM configuration) associated with each allowed MRB may be suspended, released, or kept by the UE, or based on NW instructions. In the present disclosure, the terms "suspending configuration," "suspense configuration," and "suspendConfig" may be used interchangeably.

In some implementations, a UE (e.g., an RRC_INACTIVE UE or an RRC_CONNECTED UE) may receive an RRC release message with a suspending configuration that indicates the allowed MRB(s) (e.g., in an MRB list) configured for MBS multicast reception in the RRC_INACTIVE state. It should be noted that an RRC_CONNECTED UE may transition to the RRC_INACTIVE state in response to receiving an RRC release message with the suspending configuration, and an RRC_INACTIVE UE may remain in the RRC_INACTIVE state in response to receiving an RRC release message with the suspending configuration.

In some implementations, in response to a UE (e.g., an RRC_INACTIVE UE or an RRC_CONNECTED UE) receiving an RRC release message with a suspending configuration indicating the allowed MRB(s) (e.g., in an MRB list) configured for MBS multicast reception in the RRC_INACTIVE state, the associated MRB configuration (e.g., the configuration received previously or the configuration received in the RRC release message) may be stored (e.g., as part of the UE Inactive context). In some implementations, in response to a UE (e.g., an RRC_INACTIVE UE or an RRC_CONNECTED UE) receiving an RRC release message with a suspending configuration indicating the allowed MRB(s) (e.g., in an MRB list) configured for MBS multicast reception in the RRC_INACTIVE state, the PTP leg (or PTP configuration) associated with each of the allowed MRB(s) may be suspended/released. That is, only the PTM leg (or PTM configuration) associated with each of the allowed MRB(s) may remain or may be operated. The UE may only receive data of (active) multicast service/session via the PTM leg of each allowed MRB(s) in the RRC_INACTIVE state. In some implementations, in response to a UE (e.g., an RRC_INACTIVE UE or an RRC_CONNECTED UE) receiving an RRC release message with a suspending configuration indicating the allowed MRB(s) (e.g., in an MRB list) configured for MBS multicast reception in the RRC_INACTIVE state, the HARQ operation (or HARQ resources) of the PTM leg (or PTM configuration) associated with each of the allowed MRB(s) may be suspended/released.

In some implementations, in response to a UE (e.g., an RRC_INACTIVE UE or an RRC_CONNECTED UE) receiving an RRC release message with a suspending configuration indicating the allowed MRB(s) (e.g., in an MRB list) that is configured for MBS multicast reception in the RRC_INACTIVE state, the HARQ operation (or HARQ resources) of the PTM leg (or PTM configuration) associated with each of the allowed MRB(s) may remain or may be kept by the UE. In some implementations, in response to receiving an RRC release message with a suspending configuration that indicates the allowed MRB(s) (e.g., in an MRB list) configured for MBS multicast reception in the RRC_INACTIVE state, the UE may follow the NW's instruction(s) to determine whether the HARQ operation (or HARQ resources) of the PTM leg (or PTM configuration) associated with each of the allowed MRB(s) should be suspended/released or kept. In some implementations, in response to a UE receiving an RRC release message with a suspending configuration that indicates the allowed MRB(s) configured for MBS multicast reception in the RRC_INACTIVE state, the PTP leg (or PTP configuration) associated with each of the allowed MRB(s) may be suspended/released by the UE, and the NW may instruct whether the associated PTP configuration should be stored or released. In some implementations, in response to the UE receiving an RRC release message with a suspending configuration that indicates the allowed MRB(s) configured for MBS multicast reception in the RRC_INACTIVE state, the PTP leg (or PTP configuration) associated with each of the allowed MRB(s) may be autonomously released by the UE. In some implementations, a UE may reestablish the RLC entity of an RLC bearer if the RLC bearer is associated with an MRB configured for MBS multicast reception in the RRC_INACTIVE state.

In some implementations, if a UE (e.g., a UE interested in MBS Multicast reception or whose interested MBS service/session is still on-going/active or has joined one or more multicast services/sessions) receives an RRC release message with suspending configuration, the UE may assume that the currently configured MRB(s) and/or the associated multicast MRB configuration(s) remain valid in the RRC_INACTIVE state. That is, the UE may continue or start performing MBS multicast reception based on the current multicast MRB configuration(s) and/or the associated RLC/MAC/Physical (PHY) configuration(s) in the RRC_INACTIVE state.

In some implementations, a UE may stop performing MBS multicast reception in the RRC_INACITVE state if the NW indicates that the UE's interested multicast service(s)/session(s) are deactivated. In some implementations, a NW (or a serving BS) may inform a UE that a multicast service/session is deactivated (e.g., via dedicated signaling or broadcast signaling). In response to a multicast service/session being deactivated, a UE may determine that the data of the multicast service/session is not transmitted by the current serving cell (or current serving BS). In some implementations, a NW (or a serving BS) may inform a UE (e.g., an RRC_INACTVE UE or an RRC_CONNECTED UE) that a multicast service/session is deactivated via paging DCI, short message, or paging message.

A Temporary Mobile Group Identity (TMGI) or an MBS session Identity (ID) may be used to indicate which multicast service/session is deactivated. For example, if a TMGI is provided in a deactivated list in a paging message, a UE that receives the paging message may realize that the corresponding multicast service/session is deactivated. The mapping between a TMGI/MBS session ID and a multicast service/session may be provided by the BS (e.g., via an RRC message) or the CN (e.g., via Non-Access Stratum (NAS) message).

In some implementations, if a UE (e.g., an RRC_INACTVE UE or an RRC_CONNECTED UE) has joined a multicast service/session and is informed that the multicast service/session is deactivated, the UE may forward the associated TMGI (or MBS session ID) to the upper layers (e.g., NAS layer) and/or may stop performing MBS multicast reception associated with the deactivated multicast service/session (e.g., UE may suspend the associated multicast MRB configuration or stop multicast data reception based on the associated RLC/MAC/PHY configuration(s)). In some implementations, if a UE (e.g., an RRC_INACTVE UE or an RRC_CONNECTED UE) has joined a multicast service/session and the UE is informed via paging (e.g., paging message, short message, or paging DCI) that the multicast service/session is deactivated and the UE's ID is not included in the paging record(s) in the paging (e.g., paging message, short message, or paging DCI), the UE may stop performing MBS multicast reception associated with the deactivated multicast service/session (e.g., UE may suspend the associated multicast MRB configuration and/or stop multicast data reception based on the associated RLC/MAC/PHY configuration(s)). In some implementations, if a UE (e.g., an RRC_INACTVE UE or an RRC_CONNECTED UE) has joined a multicast service/session and the UE is informed via paging (e.g., paging message, short message, or paging DCI) that the multicast service/session is deactivated and the UE's ID is included in the paging record(s) in the paging (e.g., paging message, short message, or paging DCI), the UE may stop performing MBS multicast reception associated with the deactivated multicast service/session (e.g., UE may suspend the associated multicast MRB configuration or stop multicast data reception based on the associated RLC/MAC/PHY configuration(s) and/or may initiate an RRC connection resume procedure).

In some implementations, a UE may stop performing MBS multicast reception in the RRC_INACITVE state if the NW indicates that configuration(s) related to its interested (or joined) multicast service(s)/session(s) are changed/updated. In some implementations, a NW (or a serving base station) may inform a UE (e.g., an RRC_INACTVE UE or an RRC_CONNECTED UE) that configuration(s) related to a multicast service/session is changed/updated.

In some implementations, a NW (or a serving base station) may inform a UE (e.g., an RRC_INACTVE UE or an RRC_CONNECTED UE) that configuration(s) related to a multicast service/session is changed/updated via paging DCI, short message, or paging message. For example, if a TMGI is provided in a change list in a paging message, a UE that receives the paging message may realize that configuration(s) related to the corresponding multicast service/session is changed/updated. A TMGI or an MBS session ID may be used to indicate that the configuration(s) related to the corresponding multicast services/sessions are changed/updated. The mapping between a TMGI/MBS session ID and a multicast service/session may be provided by a base station (e.g., via an RRC message) or by the CN (e.g., via an NAS message).

In some implementations, if a UE (e.g., an RRC_INACTVE UE or an RRC_CONNECTED UE) has joined a multicast service/session and is informed that configuration(s) related to the multicast service/session is changed/updated, the UE may forward the associated TMGI (or MBS session ID) to the upper layers (e.g., NAS layer) and/or may stop performing MBS multicast reception associated with the multicast service/session (e.g., UE may suspend the associated multicast MRB configuration or stop multicast data reception based on the associated RLC/MAC/PHY configuration(s)).

In some implementations, if a UE (e.g., an RRC_INACTVE UE or an RRC_CONNECTED UE) has joined a multicast service/session and the UE is informed via paging (e.g., paging message, short message, or paging DCI) that configuration(s) related to the multicast service/session is changed/updated and the UE's ID is not included in the paging record(s) in the paging (e.g., paging message, short message, or paging DCI), the UE may forward the associated TMGI (or MBS session ID) to the upper layers (e.g., NAS layer) and/or may stop performing MBS multicast reception associated with the multicast service/session (e.g., UE may suspend the associated multicast MRB configuration or stop multicast data reception based on the associated RLC/MAC/PHY configuration(s)).

In some implementations, if a UE (e.g., an RRC_INACTVE UE or an RRC_CONNECTED UE) has joined a multicast service/session and the UE is informed via paging (e.g., paging message, short message, or paging DCI) that configuration(s) of the multicast service/session is changed/updated and the UE's ID is included in the paging record(s) in the paging (e.g., paging message, short message, or paging DCI), the UE (i) may forward the associated TMGI (or MBS session ID) to the upper layers (e.g., NAS layer), (ii) may stop performing MBS multicast reception associated with the deactivated multicast service/session (e.g., UE may suspend the associated multicast MRB configuration or stop multicast data reception based on the associated RLC/MAC/PHY configuration(s)), and/or (iii) may initiate an RRC connection resume procedure.

In some implementations, if a UE (e.g., an RRC_INACTVE UE) has joined a multicast service/session and is informed that configuration(s) related to the multicast service/session is changed/updated, the UE may initiate an RRC connection resume procedure. In some implementations, if a UE (e.g., an RRC_INACTVE UE) has joined a multicast service/session and is informed via paging (e.g., paging message, short message, or paging DCI) that configuration(s) related to the multicast service/session is changed/updated, the UE may initiate an RRC connection resume procedure.

In some implementations, a UE (e.g., an RRC_INACTIVE UE or an RRC_CONNECTED UE) may receive pre-configured Physical Downlink Shared Channel (PDSCH) resources (e.g., one or more configured DL assignment configuration(s)/PDSCH configuration(s)) or pre-configured PDCCH configuration(s) (or Control Resource Set(s) (CORESET(s)), search space(s)) for MBS multicast reception in the RRC_INACRTIVE state. It should be noted that the above-mentioned configuration(s) may be part of a PTM configuration of an MRB (or its associated multicast service/session). For example, a UE may receive interested multicast data in the pre-configured PDSCH resources in the RRC_INACITVE state. For example, a UE may monitor/decode PDCCH (or receive downlink control information (DCI)) with a cyclic redundancy check (CRC) scrambled by a Multicast-related RNTI (e.g., G-RNTI or G-CS-RNTI) based on the pre-configured PDCCH configuration(s) (or CORESET(s), search space(s)). The pre-configured PDSCH configuration(s) or the pre-configured PDCCH configuration(s) (or CORESET(s), search space(s)) may be provided via dedicated signaling (e.g., an RRC release message with suspending configuration). The pre-configured PDSCH configuration(s) or the pre-configured PDCCH configuration(s) (or CORESET(s), search space(s)) may be associated with one or more multicast MRB (or the corresponding logical channel(s)) which are configured for MBS multicast reception in the RRC_INACTIVE state. For example, the NW may indicate/instruct that a first pre-configured PDSCH configuration is allowed/configured for a first multicast MRB and a second pre-configured PDSCH configuration is allowed/configured for a second multicast MRB. For example, the NW may indicate/instruct that a first PDCCH configuration (or CORESET, search space) is allowed/configured for a first multicast MRB and a second PDCCH configuration (or CORESET, search space) is allowed/configured for a second multicast MRB.

In some implementations, there may be a timer T1 configured for each pre-configured PDSCH configuration or pre-configured PDCCH configuration (or CORESET, search space). The NW may configure the timer T1 in the associated PDSCH configuration or in the associated PDCCH configuration or in the same message which including the associated PDSCH/PDCCH configuration. In some implementations, if the timer T1 of a pre-configured PDSCH configuration or pre-configured PDCCH configuration (or CORESET, search space) is absent (or is not provided), the pre-configured PDSCH configuration or the pre-configured PDCCH configuration (or CORESET, search space) is considered to be valid until receiving the NW's instruction to suspend, update, or release the pre-configured PDSCH configuration or the pre-configured PDCCH configuration. In some implementations, the timer T1 may (re)start in response to at least, but not limited to, one of the following: the UE transitioning to the RRC_INACTIVE state, performing MBS multicast reception in the RRC_INACTIVE state, the UE receiving a configuration to (re)set/configure the timer T1, the UE receiving information of the associated interested (or joined) multicast service(s)/session(s) that are activated, and the UE receiving an instruction (via an RRC message, MAC CE, or DCI) to (re)start the timer T1.

In some implementations, the timer T1 may stop in response to at least, but not limited to, one of the following: the UE transitioning to the RRC_CONNECTED state, transitioning to the RRC_IDLE state, one or more interested (joined) multicast service/session being deactivated, or the UE changing the UE's interest (e.g., stop joining one or more multicast services/sessions). In some implementations, if a timer T1 expires, the UE may trigger/initiate an RRC connection resume procedure to transition to the RRC_CONNECTED state. In some implementations, if a UE is still interested in MBS multicast reception (or still joins one or more multicast services/sessions) and the timer T1 associated with the pre-configured PDSCH configuration or the pre-configured PDCCH configuration (or CORESET, search space) expires, the UE may trigger/initiate an RRC connection resume procedure to transition to the RRC_CONNECTED state. In some implementations if the timer T1 expires, the UE may release the associated PDSCH/PDCCH configuration(s). In some implementations, if the timer T1 expires, the UE may stop receiving interested multicast data in the pre-configured PDSCH resources (based on the associated PDSCH configuration(s)) in the RRC_INACITVE state. In some implementations if a timer T1 expires, the UE may stop monitoring/decoding PDCCH (or stop receiving downlink control information (DCI)) with a Cyclic Redundancy Check (CRC) scrambled by a Multicast RNTI (e.g., G-RNTI or G-CS-RNTI) based on the pre-configured PDCCH configuration(s) (or CORESET(s), search space(s)). A UE may monitor a set of PDCCH candidates in the configured monitoring occasions in one or more configured CORESETs, according to the corresponding search space configurations. A CORESET may include a set of Physical Resource Blocks (PRBs) with a time duration of 1 to 3 OFDM symbols. The resource units Resource Element Groups (REGs) and Control Channel Elements (CCEs) are defined within a CORESET with each CCE including a set of REGs. Control channels may be formed by aggregation of CCEs. Different code rates for the control channels may be realized by aggregating different number of CCEs. Interleaved and non-interleaved CCE-to-REG mappings are supported in a CORESET.

In some implementations, the multicast MRB configuration(s) (stored in the UE) and/or the associated RLC/MAC/PHY configuration (stored in the UE) used to perform MBS multicast reception in the RRC_INACTVE state may be invalid if at least one of the following conditions (1) to (5) is met:

(1) The UE receives information related to the indication/configuration that one or more multicast services/sessions (which the UE has joined) is deactivated. The information of multicast service/session deactivation may be provided via paging (e.g., paging message, short message, or paging DCI). The information of multicast service/session deactivation may be provided via a MAC CE or DCI signaling.

(2) The UE receives information related to the indication/configuration that one or more multicast services/sessions (which the UE has joined) is changed/updated. The information of change/update configuration(s) related to one or more multicast services/sessions may be provided via paging (e.g., paging message, short message, or paging DCI). The information of change/update configuration(s) related to one or more multicast services/sessions may be provided via a MAC CE or DCI signaling.

(3) The UE receives information to release configuration(s) associated with one or more multicast services/sessions. The information of configuration release may be provided via paging (e.g., paging message, short message, or paging DCI). The information of multicast service/session deactivation may be provided via a MAC CE or DCI signaling.

(4) A timer T2 expires. The timer T2 is configured for initiating an RRC connection resume procedure when a UE performs MBS multicast reception in the RRC_INACTIVE state. In some implementations, the timer T2 is provide via dedicated signaling (e.g., an RRC release message with a suspending configuration) or via broadcasting system information. In some implementations, the timer T2 may (re)start in a case that at least one of the following conditions is met: the UE transitions to the RRC_INACTIVE state, the UE performs MBS multicast reception in the RRC_INACTIVE state, the UE receives a configuration to (re)set/configure the timer T2, the UE receives information that the interested (or joined) multicast service(s)/session(s) are activating, and/or the UE receives an instruction (via an RRC message, a MAC CE, or DCI) to (re)start the timer T2.

In some implementations, the timer T2 may stop in a case that at least one of the following conditions is met: the UE transitions to the RRC_CONNECTED state, the UE transitions to the RRC_IDLE state, one or more interested (joined) multicast services/sessions is deactivated, and/or the UE changes its interest (e.g., stop joining one or more multicast services/sessions). The timer T2 may be configured per multicast MRB/service/session. The timer T2 may be configured per UE that performs MBS multicast reception in the RRC_INACTIVE state. In some implementations, if the timer T2 expires, the UE may trigger/initiate an RRC connection resume procedure to transition to the RRC_CONNECTED state. In some implementations, if the UE is still interested in MBS multicast reception (or still joins one or more multicast services/sessions)) and the timer T2 associated with the corresponding MBR (or multicast service/session) expires, the UE may trigger/initiate an RRC connection resume procedure to transition to the RRC_CONNECTED state.

(5) The UE leaves a specific area. The specific area may include, but not limited to, a RAN configuration area (which is configured in an RRC release message with a suspending configuration), a tracking area, a system information area (e.g., indicated by the IE, areaScope, provided in 3GPP TS 38.331) or a serving cell where the UE receives the RRC release message with a suspending configuration.

In some implementations, if the multicast MRB configuration(s) (stored in a UE) and/or the associated RLC/MAC/PHY configuration(s) (stored in the UE) used to perform MBS multicast reception in the RRC_INACTVE state is considered invalid, the UE may release the stored multicast MRB configuration(s) and/or the associated RLC/MAC/PHY configuration(s). In some implementations, if the stored multicast MRB configuration(s) of a UE and/or the associated RLC/MAC/PHY configuration(s) of the UE used to perform MBS multicast reception in the RRC_INACTVE state is considered invalid, the UE may stop receiving interested multicast data based on the stored configuration(s). In some implementations, if the stored multicast MRB configuration(s) of a UE and/or the associated RLC/MAC/PHY configuration(s) of the UE used to perform MBS multicast reception in the RRC_INACTVE state is considered invalid, the UE may initiate an RRC connection resume procedure. In some implementations, if the stored multicast MRB configuration(s) of a UE and/or the associated RLC/MAC/PHY configuration(s) of the UE used to perform MBS multicast reception in the RRC_INACTVE state is considered invalid and the UE still joins the corresponding multicast service/session, the UE may initiate an RRC connection resume procedure.

In some implementations, in a paging message, there may be a first paging group list (e.g., an activation list) for indicating the activation of multicast service(s)/session(s) and/or a second paging group list (e.g., a deactivation list) for indicating the deactivation of multicast service(s)/session(s). The activation list may be a list of TMGI(s) or a list of session ID(s). The deactivation list may be a list of TMGI(s) or a list of session ID(s). Table 1 below presents an example of the paging message, which is represented using the Abstract Syntax Notation One (ASN.1).

TABLE 1

```
-- ASN1START
-- TAG-PAGING-START
Paging ::=                        SEQUENCE {
   pagingRecordList                     PagingRecordList
OPTIONAL, -- Need N
   lateNonCriticalExtension                  OCTET STRING
OPTIONAL,
   nonCriticalExtension                    Paging-v1700-IEs
OPTIONAL
}
Paging-v1700-IEs ::=                 SEQUENCE {
   pagingRecordList-v1700                     PagingRecordList-v1700
OPTIONAL, -- Need N
   FirstpagingGroupList                     PagingGroupList-r17
OPTIONAL,
   nonCriticalExtension                    SEQUENCE { }
OPTIONAL
}
Paging-v1800-IEs ::=                 SEQUENCE {
   SecondpagingGroupList                      PagingGroupList-r17
OPTIONAL,
   nonCriticalExtension                    SEQUENCE { }
OPTIONAL
}
PagingRecordList ::=                 SEQUENCE (SIZE(1..maxNrofPageRec)) OF PagingRecord
PagingRecordList-v1700 ::=                SEQUENCE (SIZE(1..maxNrofPageRec)) OF
PagingRecord-v1700
PagingGroupList-r17 ::=                SEQUENCE (SIZE(1..maxNrofPageGroup-r17)) OF TMGI-
r17
PagingRecord ::=                   SEQUENCE {
   ue-Identity                    PagingUE-Identity,
   accessType                        ENUMERATED {non3GPP} OPTIONAL, -- Need N
   ...
}
PagingRecord-v1700 ::=                  SEQUENCE {
   pagingCause-r17                     ENUMERATED {voice} OPTIONAL -- Need N
}
PagingUE-Identity ::=                CHOICE {
   ng-5G-S-TMSI                        NG-5G-S-TMSI,
   fullI-RNTI                      I-RNTI-Value,
   ...
}
-- TAG-PAGING-STOP
-- ASN1STOP
```

In response to receiving the paging message, if the UE has joined an MBS session indicated by the TMGI (or session ID) included in the first paging group list, the UE may forward each TMGI included in the first paging group list, if any, included in the paging message to the upper layers (e.g., NAS layer).

In response to a UE receiving the paging message, for each TMGI included in the second paging group list, if any, included in the paging message, if the UE has joined an MBS session indicated by the TMGI (or session ID) included in the second paging group list, the UE may forward the TMGI to the upper layers (e.g., NAS layer).

In some implementations, in a paging message, there may be a first paging group list (e.g., an activation list) for indicating the activation of multicast service(s)/session(s), a second paging group list (e.g., a deactivation list) for indicating the deactivation of multicast service(s)/session(s), and/or a third paging group list (e.g., an update list) for indicating configuration(s) related to which multicast service(s)/session(s) is updated/changed. The activation list may be a list of TMGI(s) or a list of session ID(s). The deactivation list may be a list of TMGI(s) or a list of session ID(s). The update list may be a list of TMGI(s) or a list of session ID(s). In response to receiving a paging message, if the UE has joined an MBS session indicated by the TMGI (or session ID) included in the third paging group list, the UE may forward each TMGI included in the third paging group list, if any, included in the paging message to the upper layers (e.g., NAS layer).

In some implementations, in a paging message, there may be a fourth paging group list (e.g., a combined list) for indicating the activation of multicast service(s)/session(s) or configuration(s) related to which multicast service(s)/session(s) is updated/changed, and a second paging group list (e.g., a deactivation list) for indicating the deactivation of multicast service(s)/session(s). The combined list may be a list of TMGI(s) or a list of session ID(s). In response to a UE receiving a paging message, for each TMGI included in the fourth paging group list, if any, included in the paging message, if the UE has joined an MBS session indicated by the TMGI (or session ID) included in the fourth paging group list, the UE may forward the TMGI to the upper layers (e.g., NAS layer).

In some implementations, in a paging message, there may be a fifth paging group list (e.g., a combined list) for indicating the activation of multicast service(s)/session(s) or configuration(s) related to which multicast service(s)/session(s) is updated/changed, and a second paging group list (e.g., a deactivation list) for indicating the deactivation of multicast service(s)/session(s). A combined list may be a list of TMGI(s) or a list of session ID(s). In addition, there may be a first cause list in the paging message. The first cause list may include the same number of entries, and listed in the same order, as in the fifth paging group list. Each cause in the first cause list may indicate that the cause of a corresponding entry is "activating/activation" or "update". For example, if the cause is set to "activation," it means that the associated multicast service/session is activated. If the cause is set to "update," it means that the associated multicast service/session is updated. As another example, if the cause is set to "activation," it means that the associated multicast service/session is activated. if the cause is not present, it means that the associated multicast service/session is activated. In response to receiving the paging message, if the UE has joined an MBS session indicated by the TMGI (or session ID) included in the fifth paging group list, the UE may forward each TMGI included in the fifth paging group list, if any, included in the paging message to the upper layers (e.g., NAS layer).

In some implementations, in a paging message, there may be a first paging group list (e.g., an activation list) for indicating the activation of multicast service(s)/session(s) and a sixth paging group list (e.g., a combined list) for indicating the deactivation of multicast service(s)/session(s) or configuration(s) related to which multicast service(s)/session(s) is updated/changed. The combined list may be a list of TMGI(s) or a list of session ID(s). In addition, there may be a second cause list in the paging message, which includes the same number of entries, and listed in the same order, as in the sixth paging group list. Each cause in the second cause list may indicate that the cause of a corresponding entry is "deactivation" or "update". For example, if the cause is set to "deactivation," it means that the associated multicast service/session is deactivated. If the cause is set to "update," it means that the associated multicast service/session is updated. As another example, if the cause is set to "deactivation," it means that the associated multicast service/session is deactivated. If the cause is not present, it means that the associated multicast service/session is deactivated. In response to a UE receiving the paging message, for each TMGI included in the sixth paging group list, if any, included in the paging message, if the UE has joined an MBS session indicated by the TMGI (or session ID) included in the sixth paging group list, the UE may forward the TMGI to the upper layers (e.g., NAS layer).

In some implementations, if a UE, that is in the RRC_INACTIVE state, is not allowed/configured to perform MBS multicast reception in the RRC_INACTIVE state, and/or has joined one or more MBS session(s) indicated by the TMGI (or session ID) included in the first paging group list, the UE may initiate an RRC connection resumption procedure. If the ID of the UE is included in the paging record(s) of the paging message, it means that the UE is paged due to other reason(s) and has already triggered an RRC connection resumption procedure accordingly. In such a case, the UE may not trigger or initiate two RRC connection resumption procedures.

In some implementations, if a UE, that is in the RRC_INACTIVE state, is allowed/configured to perform MBS multicast reception in the RRC_INACTIVE state, and/or has joined one or more MBS session(s) indicated by the TMGI (or session ID) included in the first paging group list, the UE may not initiate an RRC connection resumption procedure and/or may start receiving data of the one or more MBS session(s) indicated by the TMGI included in the first paging group list. For example, the UE may start receiving data of the one or more MBS session(s) indicated by the TMGI included in the first paging group list based on MRB configuration(s) and/or RLC/MAC/PHY configuration(s) associated with the one or more MBS session(s).

In some implementations, if the UE, that is in the RRC_INACTIVE state, is not allowed/configured to perform MBS multicast reception in the RRC_INACTIVE state, and/or has joined one or more MBS session(s) indicated by the TMGI (or session ID) included in the second paging group list, the UE may not initiate an RRC connection resumption procedure. In some other implementations, if the UE is in the RRC_INACTIVE state and is not allowed/configured to perform MBS multicast reception, the UE may ignore the second paging group list in the paging message.

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the second paging group list, the UE may not initiate an RRC connection resumption procedure and/or may stop receiving data of the one or more MBS session(s) indicated by the TMGI included in the second paging group list. For example, the UE may stop receiving data of the one or more MBS session(s) indicated by the TMGI included in the second paging group list based on MRB configuration(s) and/or RLC/MAC/PHY configuration(s) associated with the one or more MBS session(s).

In some implementations, if the UE, that is in the RRC_INACTIVE state, is not allowed/configured to perform MBS multicast reception in the RRC_INACTIVE state, and/or has joined one or more MBS session(s) indicated by the TMGI (or session ID) included in the third paging group list, the UE may initiate an RRC connection resumption procedure. In some other implementations, if the UE is in the RRC_INACTIVE state and is not allowed/configured to perform MBS multicast reception in the RRC_INACTIVE state, the UE may ignore the third paging group list in the paging message.

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the third paging group list, the UE may initiate an RRC connection resumption procedure and/or may stop receiving data of the one or more MBS session(s) indicated by the TMGI included in the third paging group list until receiving the updated configuration(s) (e.g., provided in an RRC release message with a suspending configuration or provided in an RRC Reconfiguration message). In some implementations, group paging may be used to inform the UE when network changes the PTM configurations, and UE may trigger an RRC connection resume procedure to obtain the updated configurations in response to the reception of group paging.

In some implementations, if the UE, that is in the RRC_INACTIVE state, is not allowed/configured to perform MBS multicast reception in the RRC_INACTIVE state, and/or has joined one or more MBS session(s) indicated by the TMGI (or session ID) included in the fourth paging group list, the UE may initiate an RRC connection resumption procedure.

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the fourth paging group list, the UE may initiate an RRC connection resumption procedure.

In some implementations, if the UE, that is in the RRC_INACTIVE state, is not allowed/configured to perform MBS multicast reception in the RRC_INACTIVE state, and/or has joined one or more MBS session(s) indicated by the TMGI (or session ID) included in the fifth paging group list, the UE may initiate an RRC connection resumption procedure in a case that at least one of the one or more MBS session(s) is with a cause related to "activating." For example, consider a situation where UE #1 has joined MBS session(s) MBS #1, MBS #2, and MBS #3. If MBS #2 and MBS #3 are indicated in the sixth paging group list, and the cause of MBS #2 is "activating/activation/activated" while the cause of MBS #3 is "update," the UE may initiate an RRC connection resumption procedure to transition to the RRC_CONNECTED state to receive data of MBS #2. In some implementations, if the UE, that is is in the RRC_INACTIVE state, is not allowed/configured to perform MBS multicast reception in the RRC_INACTIVE state, and has joined one or more MBS session(s) indicated by the TMGI (or session ID) included in the fifth paging group list, the UE may not initiate an RRC connection resumption procedure in a case that all corresponding cause(s) of the one or more MBS session(s) is related to "update."

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the fifth paging group list, the UE may start receiving data of the one or more MBS session(s) with a cause related to "activating." For example, consider a situation where UE #1 has joined MBS session(s) MBS #1, MBS #2, and MBS #3. If MBS #2 and MBS #3 are indicated in the fifth paging group list, and the causes of both MBS #2 and MBS #3 are "activating," the UE may start receiving data of MBS #2 and MBS #3 If the cause of MBS #2 is "activation" and the cause of MBS #3 is "update," the UE may start receiving data of MBS #2 only.

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the fifth paging group list, the UE may initiate an RRC connection resumption procedure in a case that at least one of the one or more MBS session(s) is with a cause related to "update." For example, consider a situation where UE #1 has joined MBS session(s) MBS #1, MBS #2, and MBS #3. If MBS #2 and MBS #3 are indicated in the fifth paging group list, and the cause of MBS #2 is "activation" while the cause of MBS #3 is "update," the UE may initiate an RRC connection resumption procedure to transition to the RRC_CONNECTED state to update the corresponding configuration(s) related to MBS #3.

In some implementations, if the UE, that is in the RRC_INACTIVE state, is not allowed/configured to perform MBS multicast reception in the RRC_INACTIVE state, and/or has joined one or more MBS session(s) indicated by the TMGI (or session ID) included in the sixth paging group list, the UE may not initiate an RRC connection resumption procedure.

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the sixth paging group list, the UE may stop receiving data of the one or more MBS session(s) with a cause related to "deactivating/deactivation/deactivated." For example, consider a situation where UE #1 has joined MBS session(s) MBS #1, MBS #2, and MBS #3. If MBS #2 and MBS #3 are indicated in the sixth paging group list, and the causes of both MBS #2 and MBS #3 are "deactivating," the UE may stop receiving data of MBS #2 and MBS #3. If the cause of MBS #2 is "deactivation" and the cause of MBS #3 is "update," the UE may stop receiving data of MBS #2 and MBS #3. The UE may also initiate an RRC connection resumption procedure to transition to the RRC_CONNECTED state to update the configuration(s) related to MBS #3.

In some implementations, if the UE, that is in the RRC_INACTIVE state, is allowed/configured to perform MBS multicast reception in the RRC_INACTIVE state, and/or has joined one or more MBS session(s) indicated by the TMGI (or session ID) included in the sixth paging group list, the UE may initiate an RRC connection resumption procedure in a case that at least one of the one or more MBS session(s) is with a cause related to "update." For example, consider a situation where UE #1 has joined MBS session(s) MBS #1, MBS #2, and MBS #3. If MBS #2 and MBS #3 are indicated in the sixth paging group list, with the causes of MBS #2 and MBS #3 being "deactivation" and "update," respectively, the UE may initiate an RRC connection resumption procedure to transition to the RRC_CONNECTED state to update the corresponding configuration(s) related to MBS #3.

Figure 2:
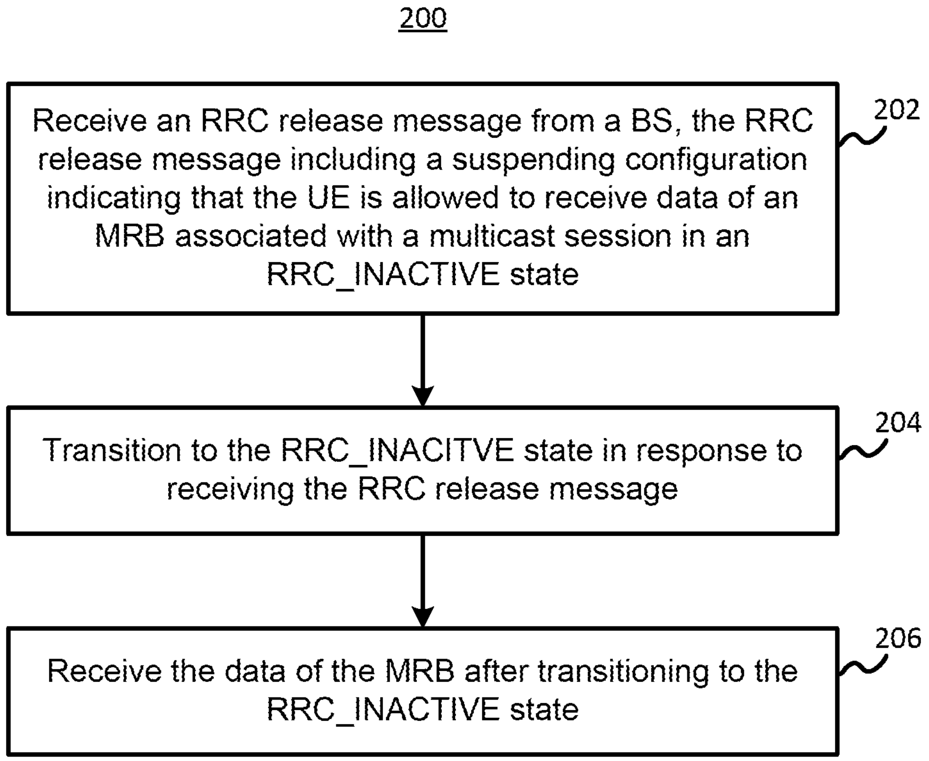
FIG. 2 is a flowchart of a method for MBS-related operations, according to an example implementation of the present disclosure.

FIG. 2 is a flowchart of a method 200 for MBS-related operations, according to an example implementation of the present disclosure. It should be noted that although actions 202, 204, and 206 are illustrated as separate actions represented as independent blocks in FIG. 2, these separately illustrated actions should not be construed as necessarily order-dependent. The order in which the actions are performed in FIG. 2 is not intended to be construed as a limitation, and any number of the disclosed blocks may be combined in any order to implement the method, or an alternate method. Moreover, each of actions 202, 204 and 206 may be performed independently of other actions and may be omitted in some implementations of the present disclosure.

In action 202, the UE may receive an RRC release message from the BS. The RRC release message (e.g., RRCRelease) may include a suspending configuration (e.g., suspendConfig) indicating that the UE is allowed to receive data of an MRB associated with a multicast session in an RRC_INACTIVE state. The RRC release message including the suspending configuration may refer to the RRC message with a suspending configuration as described in the present disclosure. Additionally, in this action, the UE may be operating in an RRC state that is different from the RRC_INACITVE state.

In action 204, the UE may transition to the RRC_INACITVE state in response to receiving the RRC release message.

In action 206, the UE may receive the data of the MRB after transitioning to the RRC_INACTIVE state. Specifically, the UE may receive the data of the MBR when a multicast service/session associated with the MBR is active/activated, after transitioning to the RRC_INACTIVE state. In some implementations, the action of receiving the data of the MRB may include the UE applying a G-RNTI to receive (or decode) the data of the MRB.

In some implementations, the UE may join (or have joined) a multicast session associated with the MRB before receiving the data of the MRB.

In some implementations, the UE may refrain from transmitting a HARQ feedback corresponding to the data of the MRB.

In some implementations, the UE may receive a PTM configuration of the MRB from the BS before receiving the data of the MRB (e.g., before action 206). The UE may apply the PTM configuration to receive the data of the MRB. It should be noted that the PTM configuration may include, but not limited to, configured DL assignment configuration(s)/PDSCH configuration(s)) and/or pre-configured PDCCH configuration(s).

Leveraging the method 200, the network (e.g., the BS) is capable of effectively communicating with the UE by transmitting an RRC release message that indicates whether the UE is permitted to receive data of an MRB in the RRC_INACTIVE state. This method effectively reduces network congestion and latency and helps to reduce the overall power consumption of the system. By allowing the UE to receive data of an MRB in the RRC_INACTIVE state, the network does not have to serve all UEs simultaneously, and hence, increasing network capacity. Furthermore, the power-efficient nature of the RRC_INACTIVE state may extend the battery life of the UE, providing a more sustainable and efficient solution for data reception.

Figure 3:
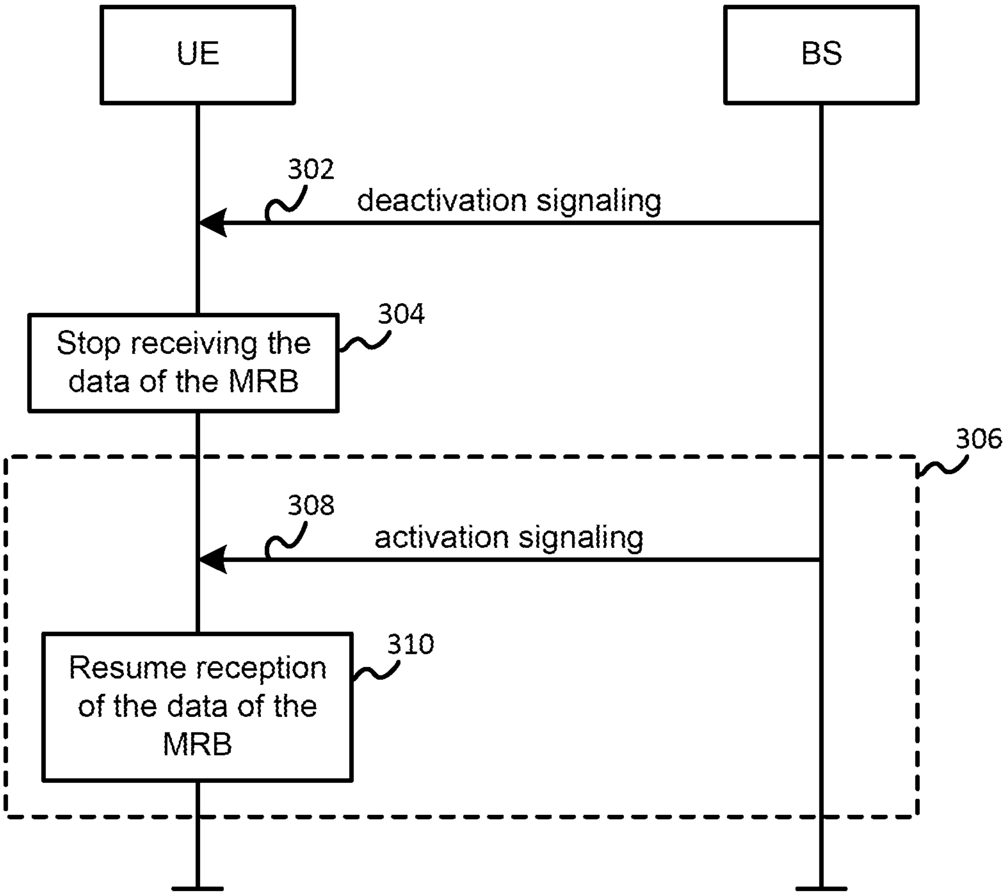
FIG. 3 is a diagram illustrating a procedure of a UE responding to signaling received from a BS to stop/resume data reception for an MBS while operating in the RRC_INACTIVE state, according to an example implementation of the present disclosure.

FIG. 3 is a diagram illustrating a procedure of a UE responding to signaling received from a BS to stop/resume data reception for an MBS while operating in the RRC_INACTIVE state, according to an example implementation of the present disclosure. The procedure may be considered as either a further elaboration of method 200 illustrated in FIG. 2, providing more detailed actions, or as an independent approach providing a more detailed or alternative way of performing MBS-related operations.

In action 302, the UE may receive deactivation signaling from the BS. Specifically, the UE may receive deactivation signaling from the BS while the UE is currently receiving data of MRB associated with an active multicast service/session. The deactivation signaling may indicate that the multicast session associated with the MRB is to be deactivated. For example, after the UE transitions to the RRC_INACTIVE state and starts receiving data of an MBS (e.g., as described in action 206 of FIG. 2), the UE may further receive deactivation signaling from the BS.

In action 304, the UE may stop receiving the data of the MRB in response to receiving the deactivation signaling.

In some implementations, after the UE stops receiving the data of the MRB, the BS may perform further actions (e.g., the actions included in operation 306) to resume/reactivate the data reception of the UE. For example, in action 308, the UE may receive activation signaling from the BS after stopping receiving the data of the MRB, where the activation signaling may indicate that the multicast session associated with the MRB is to be activated. In some other implementations, the activation signaling may indicate that the multicast session associated with the MRB is to be activated and/or the data of the MRB is allowed to be received (by the UE) in the RRC_INACTIVE state.

In some implementations, the BS may transmit, to the UE, the activation signaling via a paging message. For example, the action of receiving the activation signaling (e.g., action 308) may include the UE receiving a paging message from the BS, where the paging message may include a TMGI associated with the multicast session. Specifically, the paging message may indicate that the multicast session associated with the MRB is to be activated and/or the data of the MRB is allowed to be received (by the UE) in the RRC_INACTIVE state.

In action 310, the UE may resume the reception of the data of the MRB in response to receiving the activation signaling.

In some implementations, the initiation of operation 306 or the transmission of activation signaling does not necessarily have to follow action 304. For example, in some implementations, once the UE transitions to the RRC_INACTIVE state, the UE may not initiate the reception of the data of the MRB until the UE has received the activation signaling from the BS, where the activation signaling may be used to indicate that the multicast session associated with the MRB is to be activated and/or the data of the MRB is allowed to be received (e.g., by the UE) in the RRC_INACTIVE state.

Figure 4:
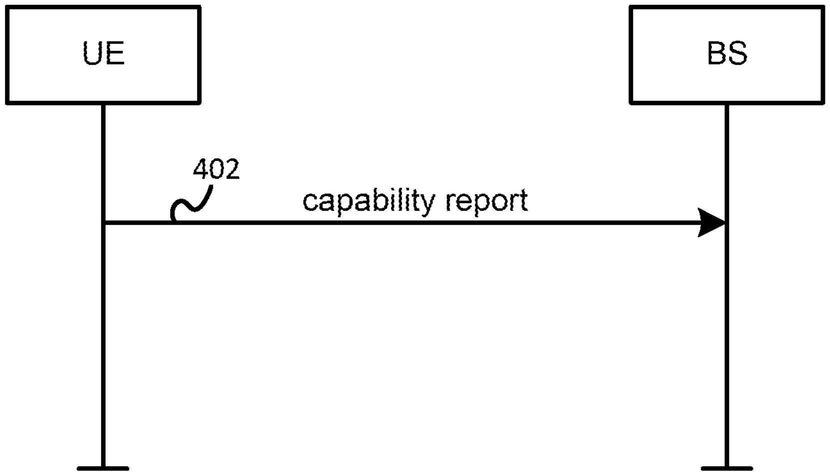
FIG. 4 is a diagram illustrating a procedure of a UE transmitting a capability report to a BS, according to an example implementation of the present disclosure.

FIG. 4 is a diagram illustrating a procedure of a UE transmitting a capability report to a BS, according to an example implementation of the present disclosure. The procedure may be considered as either a further elaboration of method 200 illustrated in FIG. 2 or the procedure of FIG. 3, providing more detailed actions, or as an independent approach providing a more detailed or alternative way of performing MBS-related operations.

As illustrated in FIG. 4, in action 402, the UE may transmit a capability report to the BS, where the capability report may indicate that the UE supports receiving the data of the MRB in the RRC_INACTIVE state. The transmission of the capability report aligns with the mechanisms of the UE capability reporting as described in the present disclosure. Here, the term "capability report" may also refer to a reported "capability" as discussed in the present disclosure.

It should be noted that in the present disclosure, the BS may perform methods/actions corresponding to those performed by the UE. For example, the receiving actions performed by the UE may correspond to the transmitting/configuring actions of the BS; the transmitting actions performed by the UE may correspond to the receiving actions of the BS. That is, the BS and the UE may have reciprocally aligned roles in transmission and reception. Consequently, the methods or actions executed by the BS may be combined or integrated in a similar manner to how the methods or actions are executed by the UE.

For example, when viewed from the BS's perspective, method 200 may correspond to a method performed by the BS. Specifically, the BS may transmit an RRC release message to the UE, causing the UE to transition to an RRC_INACTIVE state, where the RRC release message may include a suspending configuration indicating that the UE is allowed to receive data of an MRB associated with a multicast session in the RRC_INACTIVE state. The BS may transmit the data of the MRB to the UE after transmitting the RRC release message to the UE. For example, the BS may transmit the data of the MRB to the UE while the UE is in the RRC_CONNECTED state, and continue the transmission even when the UE enters the RRC_INACTIVE stat. In another example, the BS may transmit (or start to transmit) the data of the MRB to the UE after the UE transitions to the RRC_INACTIVE state.

In some implementations, the BS may transmit deactivation signaling to the UE (e.g., corresponding to action 302 in FIG. 3), causing the UE to stop receiving the data of the MRB, where the deactivation signaling indicates that the multicast session associated with the MRB is to be deactivated.

In some implementations, the BS may transmit activation signaling to the UE (e.g., corresponding to action 308 in FIG. 3), causing the UE to resume the reception of the data of the MRB, where the activation signaling may indicate that the multicast session associated with the MRB is to be activated (or the data of the multicast session associated with the MRB is allowed to be received in the RRC_INACITVE state). In some implementations, the BS may transmit the activation signaling to the UE by transmitting a paging message to the UE, where the paging message may include a TMGI associated with the multicast session.

In some implementations, the BS may receive a capability report from the UE (e.g., corresponding to action 402 in FIG. 4), where the capability report may indicate that the UE supports to receive the data of the MRB in the RRC_INACTIVE state.

Figure 5:
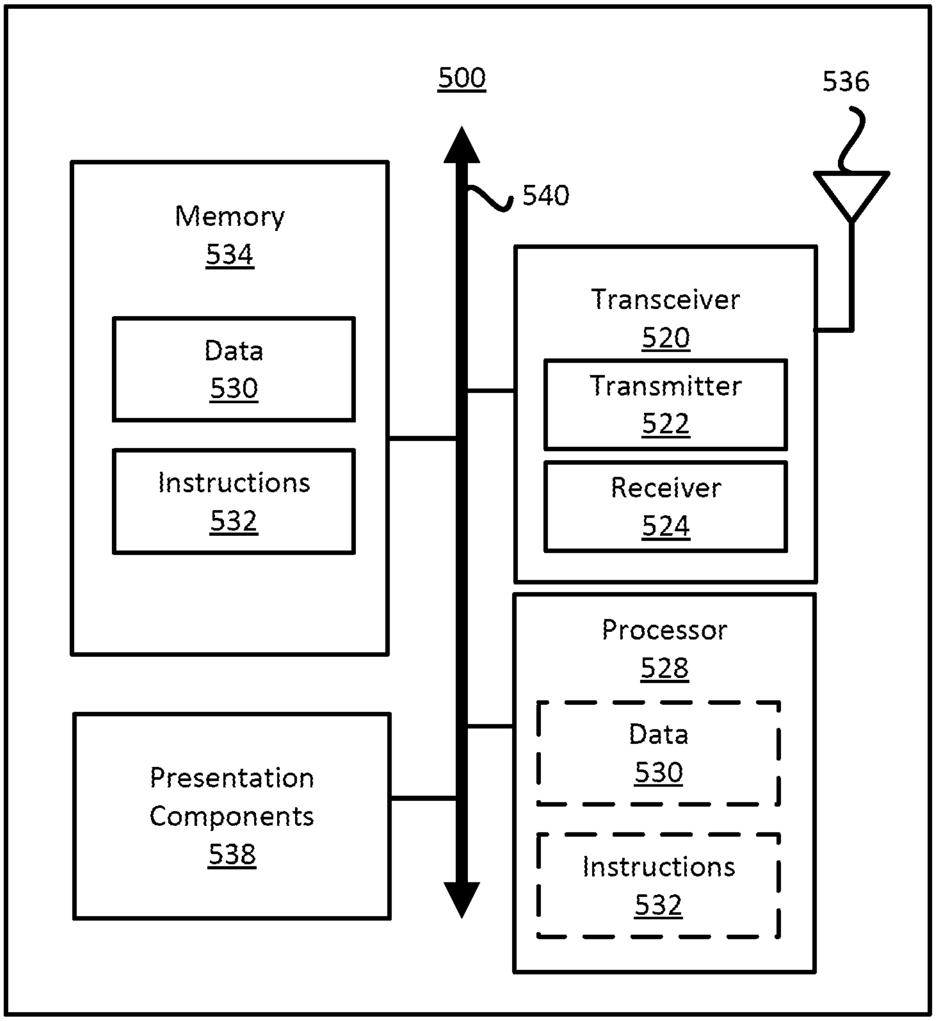
FIG. 5 is a block diagram illustrating a node for wireless communication, according to an example implementation of the present disclosure.

FIG. 5 is a block diagram illustrating a node 500 for wireless communication, according to an example implementation of the present disclosure. As illustrated in FIG. 5, a node 500 may include a transceiver 520, a processor 528, a memory 534, one or more presentation components 538, and at least one antenna 536. The node 500 may also include a radio frequency (RF) spectrum band module, a BS communications module, a NW communications module, and a system communications management module, Input/Output (I/O) ports, I/O components, and a power supply (not illustrated in FIG. 5).

Each of the components may directly or indirectly communicate with each other over one or more buses 540. The node 500 may be a UE or a BS that performs various functions disclosed with reference to FIGS. 1 through 4.

The transceiver 520 has a transmitter 522 (e.g., transmitting/transmission circuitry) and a receiver 524 (e.g., receiving/reception circuitry) and may be configured to transmit and/or receive time and/or frequency resource partitioning information. The transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired NW or direct-wired connection, and wireless media, such as acoustic, RF, infrared, and other wireless media. Combinations of any of the previously listed components should also be included within the scope of computer-readable media.

The memory 534 may include computer-storage media in the form of volatile and/or non-volatile memory. The memory 534 may be removable, non-removable, or a combination thereof. Example memory may include solid-state memory, hard drives, optical-disc drives, etc. As illustrated in FIG. 5, the memory 534 may store a computer-readable and/or computer-executable instructions 532 (e.g., software codes or programs) that are configured to, when executed, cause the processor 528 to perform various functions disclosed herein, for example, with reference to FIGS. 1 through 4. Alternatively, the instructions 532 may not be directly executable by the processor 528 but may be configured to cause the node 500 (e.g., when compiled and executed) to perform various functions disclosed herein.

The processor 528 (e.g., having processing circuitry) may include an intelligent hardware device, e.g., a Central Processing Unit (CPU), a microcontroller, an ASIC, etc. The processor 528 may include memory. The processor 528 may process the data 530 and the instructions 532 received from the memory 534, and information transmitted and received via the transceiver 520, the baseband communications module, and/or the NW communications module. The processor 528 may also process information to send to the transceiver 520 for transmission via the antenna 536 to the NW communications module for transmission to a Core Network (CN).

One or more presentation components 538 may present data indications to a person or another device. Examples of presentation components 538 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for Multicast/Broadcast Service (MBS)-related operations, the method comprising:

receiving a Radio Resource Control (RRC) release message from a Base Station (BS), the RRC release message comprising a suspending configuration indicating that the UE is allowed to receive, in an RRC_INACTIVE state, data of an MBS Radio Bearer (MRB) associated with a multicast session;

transitioning to the RRC_INACTIVE state in response to receiving the RRC release message; and upon transitioning to the RRC_INACTIVE state, refraining from initiating reception of the data of the MRB in the RRC_INACTIVE state, in spite of the suspending configuration indicating that the UE is allowed to receive the data of the MRB in the RRC_INACTIVE state, until receiving activation signaling, via a paging message, from the BS, the activation signaling indicating activation of the multicast session associated with the MRB; and initiating the reception of the data of the MRB in the RRC_INACTIVE state after receiving the activation signaling.

2. The method of claim 1, wherein the paging message comprises a Temporary Mobile Group Identity (TMGI) associated with the multicast session.

3. The method of claim 1, further comprising:

joining the multicast session associated with the MRB before receiving the data of the MRB.

4. The method of claim 1, further comprising:

refraining from transmitting a Hybrid Automatic Repeat Request (HARQ) feedback corresponding to the data of the MRB.

5. The method of claim 1, further comprising:

before receiving the RRC release message, transmitting a capability report to the BS, the capability report indicating that the UE supports receiving the data of the MRB in the RRC_INACTIVE state.

6. The method of claim 1, further comprising:

applying a Group Radio Network Temporary Identifier (G-RNTI) to receive the data of the MRB.

7. A User Equipment (UE) for Multicast/Broadcast Service (MBS)-related operations, the UE comprising:

at least one processor; and at least one memory coupled to the at least one processor, the at least one memory storing one or more computer-executable instructions that, when executed by the at least one processor, cause the UE to:

receive a Radio Resource Control (RRC) release message from a Base Station (BS), the RRC release message comprising a suspending configuration indicating that the UE is allowed to receive, in an RRC_INACTIVE state, data of an MBS Radio Bearer (MRB) associated with a multicast session;

transition to the RRC_INACTIVE state in response to receiving the RRC release message; and upon transitioning to the RRC_INACTIVE state, refrain from initiating reception of the data of the MRB in the RRC_INACTIVE state, in spite of the suspending configuration indicating that the UE is allowed to receive the data of the MRB in the RRC_INACTIVE state, until receiving activation signaling, via a paging message, from the BS, the activation signaling indicating activation of the multicast session associated with the MRB; and initiate the reception of the data of the MRB in the RRC_INACTIVE state after receiving the activation signaling.

8. The UE of claim 7, wherein the paging message comprises a Temporary Mobile Group Identity (TMGI) associated with the multicast session.

9. The UE of claim 7, wherein the one or more computer-executable instructions, when executed by the at least one processor, further cause the UE to:

join the multicast session associated with the MRB before receiving the data of the MRB.

10. The UE of claim 7, wherein the one or more computer-executable instructions, when executed by the at least one processor, further cause the UE to:

refrain from transmitting a Hybrid Automatic Repeat Request (HARQ) feedback corresponding to the data of the MRB.

11. The UE of claim 7, wherein the one or more computer-executable instructions, when executed by the at least one processor, further cause the UE to:

before receiving the RRC release message, transmit a capability report to the BS, the capability report indicating that the UE supports receiving the data of the MRB in the RRC_INACTIVE state.

12. The UE of claim 7, wherein the one or more computer-executable instructions, when executed by the at least one processor, further cause the UE to:

apply a Group Radio Network Temporary Identifier (G-RNTI) to receive the data of the MRB.

* * * * *